United States Patent [19]

Niwa et al.

[11] Patent Number: 4,686,286

[45] Date of Patent: Aug. 11, 1987

[54] DISAZO REACTIVE DYESTUFFS FOR CELLULOSE FIBERS

[75] Inventors: Toshio Niwa, Yokohama; Yoshiaki Katoh, Mitaka, both of Japan

[73] Assignee: Mitsubishi Chemical Industries Limited, Japan

[21] Appl. No.: 735,561

[22] Filed: May 17, 1985

[30] Foreign Application Priority Data

Jun. 6, 1984 [JP] Japan .................. 59-116192
Jun. 6, 1984 [JP] Japan .................. 59-116193
Jun. 6, 1984 [JP] Japan .................. 59-116195
Jun. 6, 1984 [JP] Japan .................. 59-116196

[51] Int. Cl.[4] .............. C09B 62/513; D06P 1/384; D06P 3/66
[52] U.S. Cl. .............. 534/637; 534/598; 534/617; 534/638; 534/642; 534/880; 534/884
[58] Field of Search ............... 534/642, 637, 617

[56] References Cited

FOREIGN PATENT DOCUMENTS 3327713  2/1985  Fed. Rep. of Germany ...... 534/642
46-824   1/1971  Japan .......................... 534/642
59-179666 10/1984 Japan .......................... 534/642

Primary Examiner—Floyd D. Higel
Attorney, Agent, or Firm—Jordan B. Bierman

[57] ABSTRACT

A disazo reaction dyestuff for cellulose fibers which is of the formula:

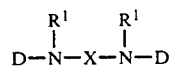

wherein D is a residue of a monoazo dye, $R^1$ is hydrogen or lower alkyl, and X is a group:

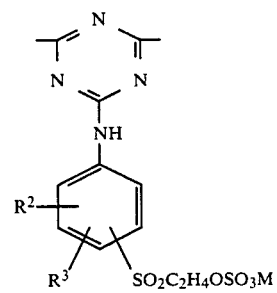

or

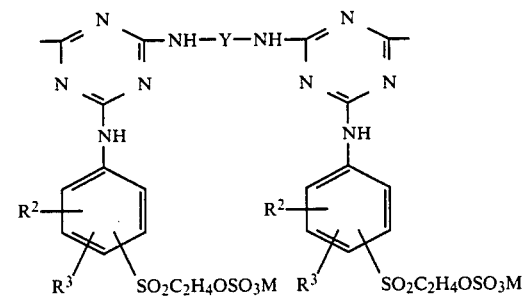

wherein $R^2$ and $R^3$ are each hydrogen, methyl, methoxy or —$SO_3M$, Y is an aromatic or aliphatic divalent residue and M is hydrogen or an alkali metal.

10 Claims, No Drawings

DISAZO REACTIVE DYESTUFFS FOR CELLULOSE FIBERS

BACKGROUND OF THE INVENTION

1. Field of the Invention

This invention relates to novel disazo reactive dyestuffs for cellulose fibers.

2. Description of the Prior Art

Heretofore, when dyeing a cellulose fiber, there has been employed a method which comprises effecting dyeing by using a reactive dyestuff in the presence of an acid-binding agent such as sodium carbonate, potassium carbonate, sodium hydroxide etc. and an electrolyte such as sodium chloride, sodium sulfate etc. at a pH of 10 or more and a temperature of not higher than 100° C.

However, in recent years, there has been an increasing demand for mixed spun cloths composed of cellulose fibers and other fibers, especially polyester fibers, and in order to dye such cellulose/polyester mixed fibers (hereinafter referred to as C/P fibers), it has been necessary to employ appropriate dyestuff and dyeing conditions for the cellulose fiber and also appropriate dyestuff and dyeing conditions for the polyester fiber respectively. It is because the dyestuff and dyeing conditions for dyeing the polyester fiber greatly differed from those for the cellulose fiber. In other words, it is because, in order to dye the polyester fiber, it was necessary to use a disperse dyestuff and dye at a temperature of about 130° C.

For example, when attempting to dye the aforesaid C/P fiber in the same step, it involves dyeing by using two different dyestuffs from a combination of a reactive dyestuff and a disperse dyestuff, and thus there are several problems. For example, in order to adequately fix the reactive dyestuff to the cellulose fiber, it is necessary to raise the pH to 10 or higher with an acid-binding agent, but the presence of the acid-binding agent promotes the decomposition of the disperse dyestuff and thus the fixation of the disperse dyestuff to the polyester fiber is inadequate. On the other hand, in order to fix the disperse dyestuff to the polyester fiber, high temperature conditions (generally 130° C.) are required, but, under such high temperature conditions under the aforesaid high pH conditions, the hydrolysis of the reactive dyestuff is greatly promoted, and thus the fixation of the dyestuff to the cellulose fiber is greatly inhibited. Therefore, where such a C/P fiber is to be dyed, it has been a common practice to employ a two-bath method which comprises dyeing first either of the cellulose or polyester fiber and subsequently dyeing the other thereof in a separate bath.

Therefore, it is an object of this invention to provide disazo dyestuffs for cellulose fibers which can dye a cellulose fiber under pH and dyeing conditions for dyeing a polyester fiber with a disperse dyestuff.

SUMMARY OF THE INVENTION

Accordingly, the gist of this invention resides in a disazo reactive dyestuff for cellulose fibers which is of the formula [I]:

wherein D is a residue of a monoazo dye, $R^1$ is hydrogen or lower alkyl, and X is a group:

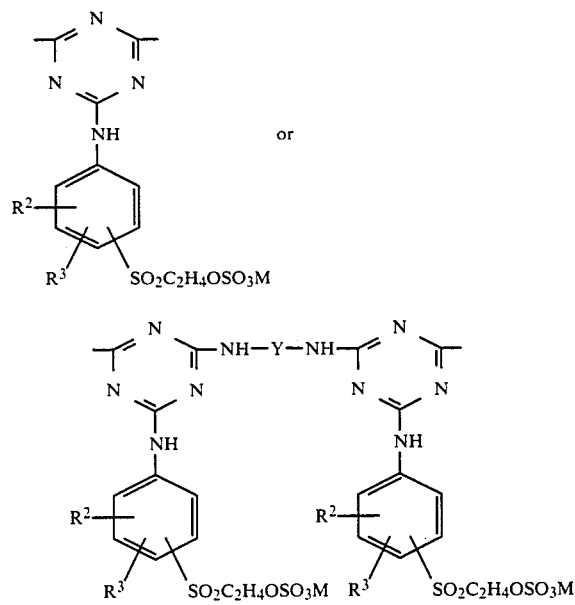

wherein $R^2$ and $R^3$ are each hydrogen, methyl, methoxy or $-SO_3M$, Y is an aromatic or aliphatic divalent residue and M is hydrogen or an alkali metal.

DETAILED DESCRIPTION OF THE INVENTION

In the disazo reactive dyestuffs of the above formula [I] for cellulose fibers of this invention, there are preferred subclasses of disazo reactive dyestuffs of the formulae [II] and [III]:

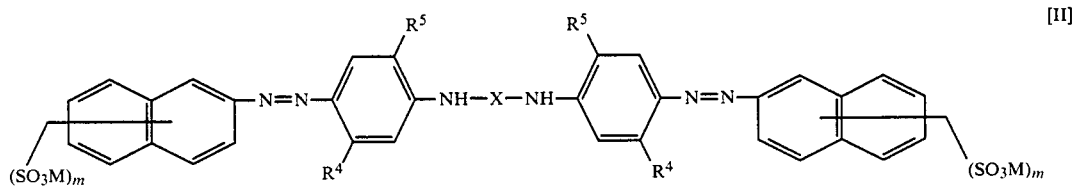

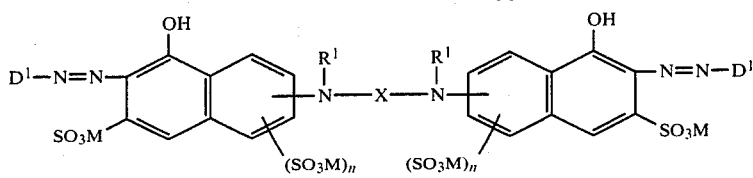

[III]

wherein $R^1$, X and M are as defined above, $D^1$ is a residue of a benzene or naphthalene type diazo component, $R^4$ is hydrogen, lower alkyl, lower alkoxy, acetylamino, carbamoylamino or chlorine, $R^5$ is hydrogen, lower alkyl or lower alkoxy, m is 2 or 3, and n is 0 or 1.

In the disazo reactive dyestuffs of the formula [I], [II] or [III] for cellulose fibers of this invention, examples of the alkali metal represented by M include sodium, potassium etc., and examples of the divalent residue represented by Y include aliphatic groups such as ethylene, 1,3-propylene, 1,4-butylene, hexamethylene etc., and phenylene, naphthalene and the like groups substituted by e.g. methyl, methoxy, carboxyl, sulfonic acid, chlorine etc.

In the disazo reactive dyestuffs of the formula [I] or [III] for cellulose fibers of this invention, examples of the lower alkyl represented by $R^1$ include alkyl of 1–4 carbon atoms.

In the disazo reactive dyestuffs of the formula [II] for cellulose fibers of this invention, examples of the lower alkyl and lower alkoxy represented by $R^4$ and $R^5$ include alkyl and alkoxy of 1–4 carbon atoms.

In the disazo reactive dyestuffs of the formula [III] for cellulose fibers of this invention, examples of the disazo component residue represented by $D^1$ include phenyl and naphthyl groups substituted by sulfonic acid, methyl, methoxy etc.

The disazo reactive dyestuffs of the above formula [I] for cellulose fibers of this invention may be produced by the following procedures [A] or [B]:

[A] Where X is:

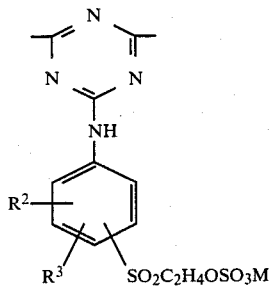

One mole portion of a compound of the formula [IV]:

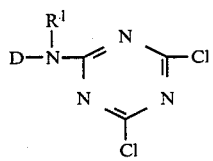

[IV]

wherein D and $R^1$ are as defined above and one mole portion of a compound of the formula [V]:

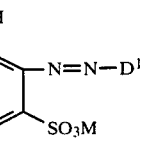

[V]

wherein D and $R^1$ are as defined above are condensed to form a disazo compound of the formula [VI]:

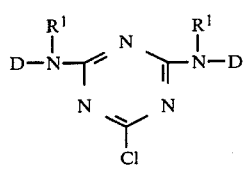

[VI]

wherein D and $R^1$ are as defined above.

Thereafter, one mole portion of a compound of the formula [VII]:

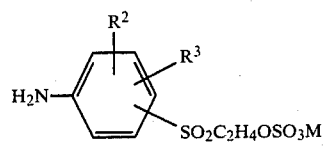

[VII]

wherein M, $R^2$ and $R^3$ are as defined above is condensed to the disazo compound of the formula [VI] obtained above, thereby a disazo reactive dyestuff of the above formula [I] for cellulose fibers of this invention may be produced.

[B] Where X is:

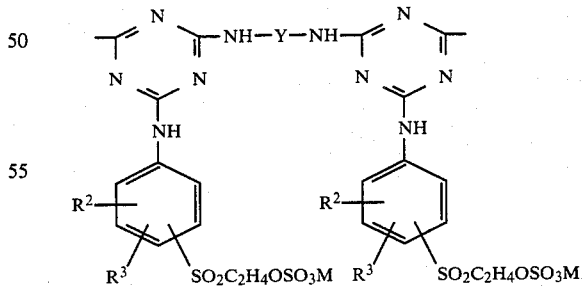

Two mole portion of a compound of the above formula [IV] and one mole portion of a compound of the formula [VIII]:

$$H_2N-Y-NH_2$$ [VIII]

wherein Y is as defined above are condensed to form a disazo compound of the formula [IX]:

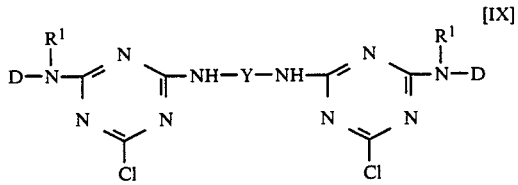

wherein D, R¹ and Y are as defined above.

Thereafter, two mole portion of a compound of the above formula [VII] is condensed to the disazo compound of the formula [IX] obtained above, thereby a disazo reactive dyestuff of the above formula [I] for cellulose fibers of this invention may be produced.

Examples of the cellulose fibers which may be dyed with the disazo reactive dyestuffs of the above formula [I] of this invention include cellulose fibers such as cotton, viscose rayon, cupra ammonium rayon, linen etc. In addition, a cellulosic fiber in a mixed fiber containing said cellulosic fiber together with polyester, triacetate, polyacrylonitrile, polyamide, wool, silk or the like may of course be successfully dyed.

In a method of dyeing fibers using the disazo reactive dyestuffs of this invention, it is possible to effect dyeing simultaneously by also adding a dyestuff required for dyeing a fiber other than the cellulosic, for example, a disperse dyestuff described in Colour Index (third ed.) etc. to the same dyeing bath for the cellulosic fiber.

Where a cellulosic fiber is to be dyed using the disazo reactive dyestuff of this invention, for example, a dyeing bath is prepared by adding a disazo reactive dyestuff of the above formula [II], a buffer required for maintaining the pH of the dyeing bath during dyeing at 5-10 (e.g. a combination of an acid such as carbonic acid, phosphoric acid, acetic acid, citric acid etc. with either single substance or mixture of sodium or potassium salts of these acids, generally in amounts of about 0.5-5 g/l) and, if necessary, an electrolyte (generally about 1-150 g/l of sodium chloride, sodium sulfate etc.), then a cellulosic fiber is dipped in this dyeing bath and heated at a temperature of 100°-150° C. for 30-50 minutes, thereby good dyeing may be effected.

Further, in order to dye a mixed spun cloth, a mixed woven fabric etc. produced by incorporating a fiber other than the cellulosic, e.g., a polyester fiber, into the cellulosic fiber, it is possible to simultaneously dye both cellulosic fiber and polyester fiber by a single-bath single-stage method by adding the disazo reactive dyestuff of the above formula [I] of this invention as well as a disperse dyestuff described in the aforesaid Colour Index to the aforesaid dyeing bath.

Alternatively, where the above-described mixed spun cloth, mixed woven fabric etc. are to be dyed, it is also possible to employ a conventionally employed single-bath two-stage method which comprises dyeing either of the fibers and subsequently dyeing the other thereof in the same dyeing bath, and furthermore, it is also possible to employ a two-bath method which comprises dyeing a cellulosic fiber and a fiber other than the cellulosic fiber in separate dyeing baths by combining a dyeing method using the disazo reactive dyestuff of this invention and a dyeing method for the fiber other than the cellulosic fiber.

This invention is more particularly described by the following examples, but it should be noted that this invention is not restricted to these examples.

EXAMPLE 1

0.2 g of a disazo reactive dyestuff of this invention having the structural formula (as the free acid form):

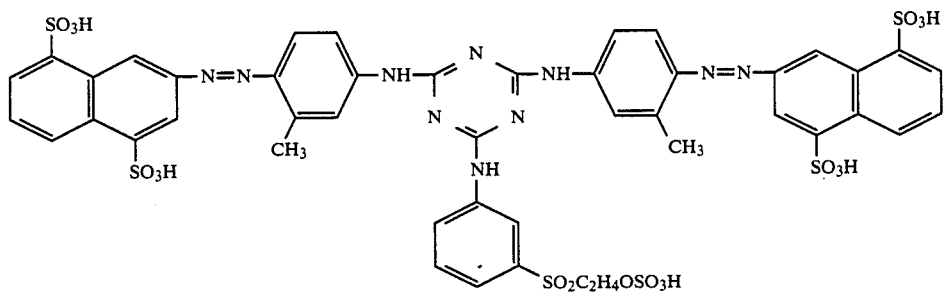

[λmax: 390 nm (water)], 16 g of Glauber salt, and, as a buffer, 0.4 g of Na₂HPO₄.12H₂O and 0.1 g of KH₂PO₄ were added to 200 ml of water to prepare a dyeing bath adjusted to pH=7. 10 g of non-mercerized knitted cotton was placed in the bath, then, after raising the temperature to 120° C. over 30 minutes, dyed at the same temperature for 60 minutes, washed with water, soaped, washed with water and dried to obtain a yellow dyed product. The degree of fixation of this dyestuff was very good, and the dyed product was of an extremely deep hue and its light fastness, chlorine fastness and sweat-sunlight fastness were all good.

The disazo reactive dyestuff used in this example was produced by condensing one mole portion of a monoazo dye of the structural formula:

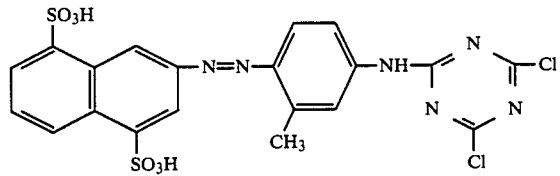

and one mole portion of a monoazo dye of the structural formula:

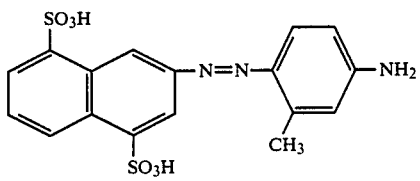

in a water medium at 30°-40° C. to produce a disazo compound of the structural formula:

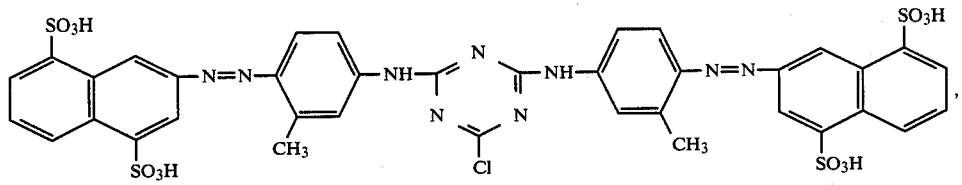

then, adding one mole portion of 3-(β-hydroxyethyl)-sulfonylaniline sulfate ester to said reaction mixture to effect condensation at 90° C., and thereafter salting out the above disazo reactive dyestuff using potassium chloride.

EXAMPLE 2

2.0 g of a disazo reactive dyestuff of the structural formula (as the free acid form):

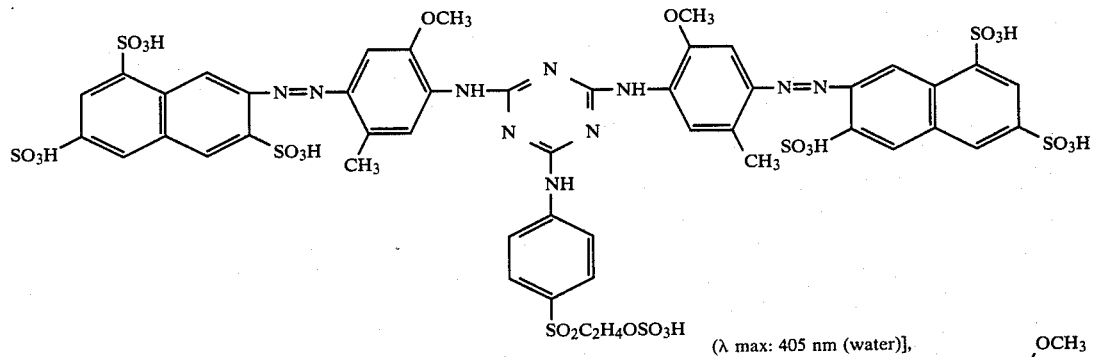

16 g of Glauber salt, and, as a buffer, 0.5 g of $Na_2HPO_4.12H_2O$ and 0.02 g of $KH_2PO_4$ were added to 200 ml of water to prepare a dyeing bath. 10 g of non-mercerized knitted cotton was placed in the bath, then, after raising the temperature to 130° C. over 30 minutes, dyed at the same temperature for 30 minutes, washed with water, soaped, washed with water and dried to obtain a product dyed in reddish yellow. This dyeing bath had pH 8 before, during and after dyeing. The obtained dyed product was of an extremely deep hue, and its light fastness, chlorine fastness and sweat-sunlight fastness were all good.

The disazo reactive dyestuff used in this example was produced by condensing one mole portion of a monoazo dye of the structural formula:

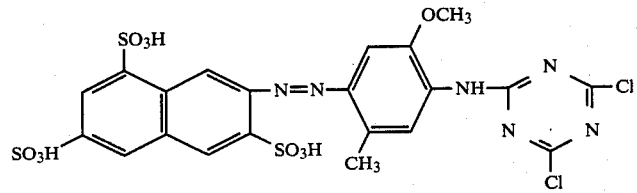

and one mole portion of a monoazo dye of the structural formula:

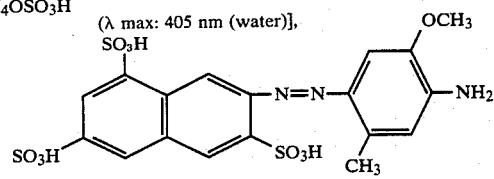

(λ max: 405 nm (water)], in a water medium at 30°–40° C. to produce a disazo compound of the structural formula:

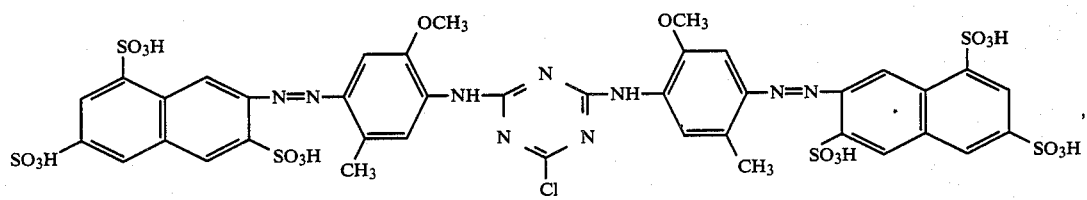

then, adding one mole portion of 4-(β-hydroxyethyl)-sulfonylaniline sulfate ester to said reaction mixture to effect condensation at 90° C., and thereafter spray drying to obtain the aforesaid disazo reactive dyestuff.

EXAMPLE 3

0.2 g of a disazo reactive dyestuff of the structural formula (as the free acid form):

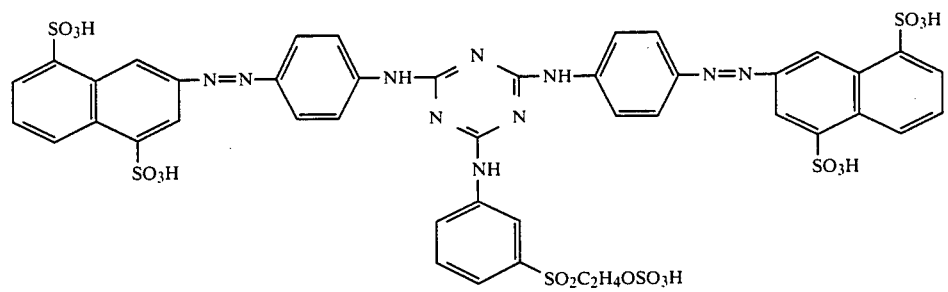

[λ max: 385 nm (water)].

0.2 g of a quinophthalone dyestuff of the structural formula:

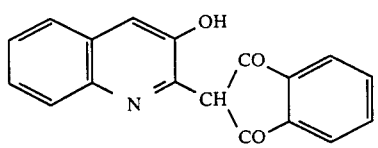

12 g of Glauber salt, and, as a buffer, 0.4 g of Na$_2$HPO$_4$.12H$_2$O and 0.1 g of KH$_2$PO$_4$ were added to 200 ml of water to prepare a dyeing bath. 10 g of a mixed spun cloth of polyester/cotton=50:50 was placed in the bath, then, after raising the temperature to 130° C. over 30 minutes, dyed at the same temperature for 60 minutes, washed with water, soaped, washed with water and dried to obtain a yellow dyed product having good homochromatic properties. This dyeing bath had pH 8 before, during and after dyeing. The degree of fixation of the dyestuffs was very good, and the dyed product was of an extremely deep hue and its light fastness, chlorine fastness and seat-sunlight fastness were all good.

The disazo reactive dyestuff used in this example was produced by procedures similar to those in Example 1 except that the monoazo dye of the structural formula:

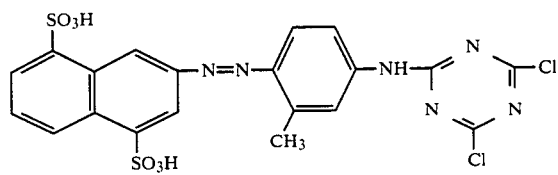

used in Example 1 was replaced by a monoazo dye of the structural formula:

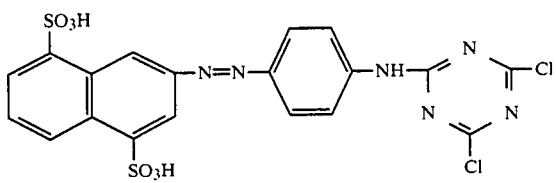

and the monoazo dye of the structural formula:

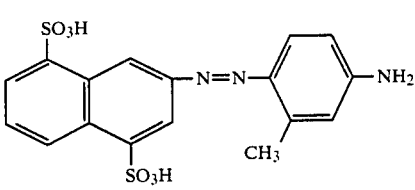

was replaced by a monoazo dye of the structural formula:

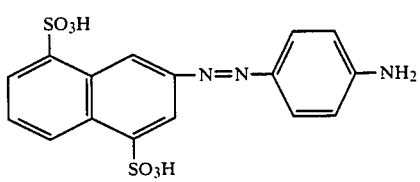

EXAMPLE 4

Cotton cloths were dyed using various disazo reactive dyestuffs of the structural formulae (as the free acid form) set forth in Table 1 in a manner sinmilar to that of Example 1. The results are shown in Table 1.

TABLE 1

General Formula:

[Structure: bis-azo naphthalene triazine dye with (SO3H)m, R4, R5 substituents and central NH-phenyl group bearing R2, R3, SO2C2H4OSO3H]

| No. | (SO₃H)ₘ naphthyl | —R⁴ | —R⁵ | R², R³, SO₂C₂H₄OSO₃H phenyl | Hue of Dyed Product | λmax (water) (nm) |
|---|---|---|---|---|---|---|
| 4-1 | 1,5-naphthalene disulfonic acid (2-yl) | —H | —H | 4-SO₂C₂H₄OSO₃H phenyl | Yellow | 385 |
| 4-2 | 1,5-naphthalene disulfonic acid (2-yl) | —H | —H | 3-SO₂C₂H₄OSO₃H phenyl | Yellow | 385 |
| 4-3 | 1,5-naphthalene disulfonic acid (2-yl) | —CH₃ | —H | 3-SO₂C₂H₄OSO₃H phenyl | Yellow | 390 |
| 4-4 | 1,5-naphthalene disulfonic acid (2-yl) | —NHCOCH₃ | —H | 2,5-di-OCH₃-4-SO₂C₂H₄OSO₃H phenyl | Yellow | 396 |
| 4-5 | 1,5-naphthalene disulfonic acid (2-yl) | —CH₃ | —OCH₃ | 4-SO₂C₂H₄OSO₃H phenyl | Yellow | 397 |
| 4-6 | 1,5-naphthalene disulfonic acid (2-yl) | —Cl | —H | 3-SO₃H-4-SO₂C₂H₄OSO₃H phenyl | Yellow | 350 |

TABLE 1-continued

General Formula:

$$\text{(SO}_3\text{H)}_m\text{-Naphthyl-N=N-}\underset{R^4}{\overset{R^5}{\text{C}_6\text{H}_2}}\text{-NH-}\underset{N}{\overset{N}{\text{C}}}\text{=N-}\underset{N}{\overset{NH}{\text{C}}}\text{-NH-}\underset{R^4}{\overset{R^5}{\text{C}_6\text{H}_2}}\text{-N=N-Naphthyl-(SO}_3\text{H)}_m$$

with central triazine bearing —NH—C$_6$H$_3$(R$^2$)(R$^3$)—SO$_2$C$_2$H$_4$OSO$_3$H

| No. | Naphthyl (SO$_3$H)$_m$ | —R$^4$ | —R$^5$ | Phenyl with R$^2$, R$^3$, SO$_2$C$_2$H$_4$OSO$_3$H | Hue of Dyed Product | λmax (water) (nm) |
|---|---|---|---|---|---|---|
| 4-7 | 1,4-disulfo naphthyl (SO$_3$H at 1,4) | —NHCOCH$_3$ | —OC$_2$H$_5$ | OCH$_3$, CH$_3$, —SO$_2$C$_2$H$_4$OSO$_3$H phenyl | Reddish Yellow | 408 |
| 4-8 | 1,4-disulfo naphthyl | —Cl | —H | 2,5-dimethoxy —SO$_2$C$_2$H$_4$OSO$_3$H phenyl | Yellow | 350 |
| 4-9 | 1,6-disulfo naphthyl | —CH$_3$ | —H | 4-(—SO$_2$C$_2$H$_4$OSO$_3$H) phenyl | Yellow | 392 |
| 4-10 | 1,6-disulfo naphthyl | —H | —H | 3-(—SO$_2$C$_2$H$_4$OSO$_3$H) phenyl | Yellow | 386 |
| 4-11 | 2,6-disulfo naphthyl | —CH$_3$ | —OCH$_3$ | 2-methyl-5-(—SO$_2$C$_2$H$_4$OSO$_3$H) phenyl | Yellow | 398 |
| 4-12 | 2,6-disulfo naphthyl | —CH$_3$ | —H | 3-(—SO$_2$C$_2$H$_4$OSO$_3$H) phenyl | Yellow | 393 |
| 4-13 | 1,3,6-trisulfo naphthyl | —NHCONH$_2$ | —H | 3-(—SO$_2$C$_2$H$_4$OSO$_3$H) phenyl | Yellow | 398 |

TABLE 1-continued

General Formula:

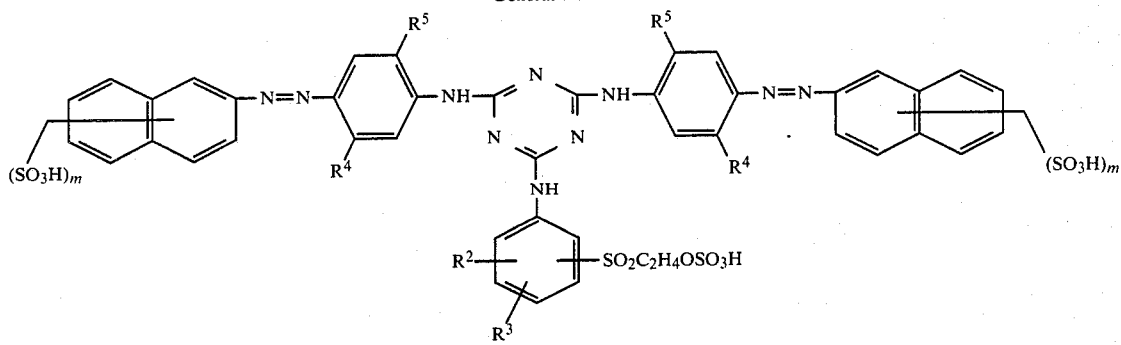

| No. | (SO₃H)$_m$ naphthyl | —R⁴ | —R⁵ | phenyl-SO₂C₂H₄OSO₃H with R²,R³ | Hue of Dyed Product | λmax (water) (nm) |
|---|---|---|---|---|---|---|
| 4-14 | naphthyl with SO₃H (1,3,6) | —CH₃ | —OCH₃ | 4-SO₂C₂H₄OSO₃H phenyl | Yellow | 396 |
| 4-15 | naphthyl with SO₃H (1,3,6) | —NHCONH₃ | —OC₂H₅ | 3-SO₂C₂H₄OSO₃H phenyl | Yellow | 380 |

EXAMPLE 5

0.2 g of a disazo reactive dyestuff of this invention having the structural formula (as the free acid form):

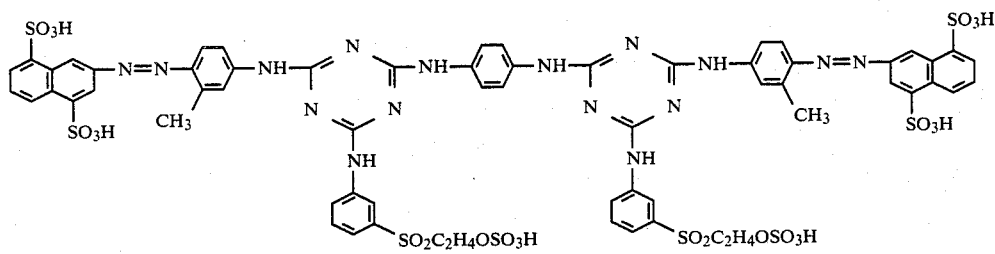

[λ max: 390 nm (water)]

16 g of Glauber salt, and, as a buffer, 0.4 g of Na₂H-PO₄.12H₂O and 0.1 g of KH₂PO₄ were added to 200 ml of water to prepare a dyeing bath adjusted to pH=7. 10 g of non-mercerized knitted cotton was placed in the bath, then, after raising the temperature to 120° C. over 30 minutes, dyed at the same temperature for 60 minutes, washed with water, soaped, washed with water and dried to obtain a yellow dyed product. The degree of fixation of this dyestuff was very good, and the dyed product was of an extremely deep hue and its light fastness, chlorine fastness and sweat-sunlight fastness were all good.

The disazo reactive dyestuff used in this example was produced by condensing two mole portion of a monoazo dye of the structural formula:

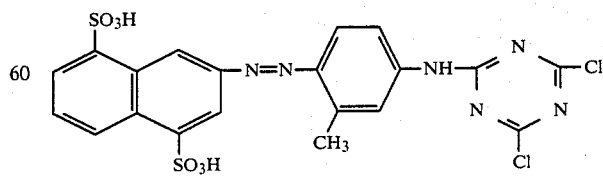

and one mole portion of p-phenylenediamine in a water medium at 30°–40° C. to produce a disazo compound of the structural formula:

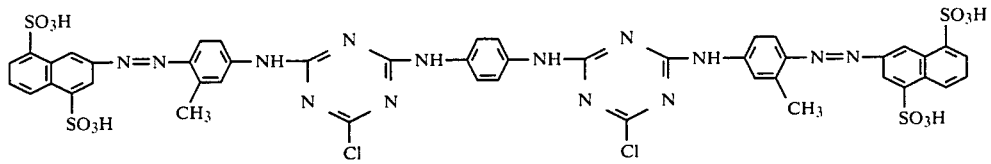

then adding two mole portion of 3-(β-hydroxyethyl)sulfonyl aniline sulfate ester to said reaction mixture to effect condensation at 90° C., and thereafter salting out the above disazo reactive dyestuff using potassium chloride.

dyed prouct was an extremely deep hue and its light fastness, chlorine fastness and sweat-sunlight fastness were all good.

The disazo reactive dyestuff used in this example was produced by condensing two mole portion of a monoazo dye of the structural formula:

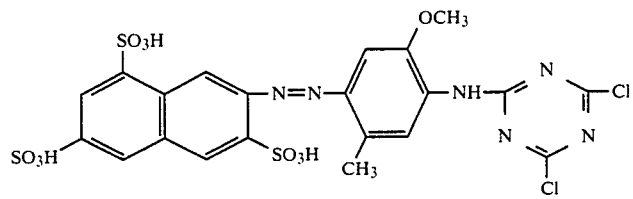

EXAMPLE 6

0.2 g of disazo reactive dyestuff of the structural formula (as the free acid form):

and one mole portion of ethylenediamine in a water medium at 30°–40° C. to produce a disazo compound of the structural formula:

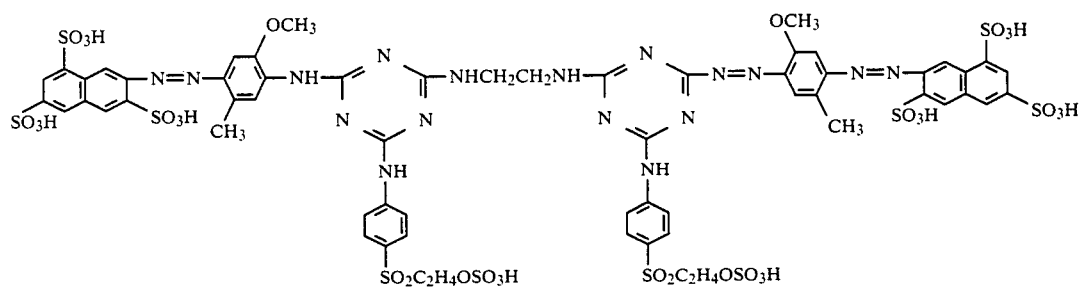

[λmax: 405 nm (water)]

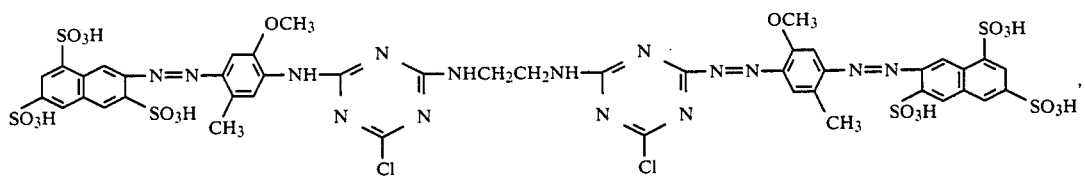

16 g of Glauber salt, and, as a buffer, 0.5 g of $Na_2HPO_4 \cdot 12H_2O$ and 0.02 g of $KH_2PO_4$ were added to 200 ml of water to prepare a dyeing bath. 10 g of non-mercerized knitted cotton was placed in the bath, then, after raising the temperature to 130° C. over 30 minutes, dyed at the same temperature for 30 minutes, washed with water, soaped, washed with water and dried to obtain a product dyed in reddish yellow. The dyeing bath had pH 8 before, during and after dyeing. The obtained then, adding two mole portion of 4-(β-hydroxyethyl)-sulfonylaniline sulfate ester to said reaction mixture to effect condensation at 90° C., and thereafter spray drying to obtain the above disazo reactive dyestuff.

EXAMPLE 7

0.2 g of a disazo reactive dyestuff of the structural formula (as the free acid form):

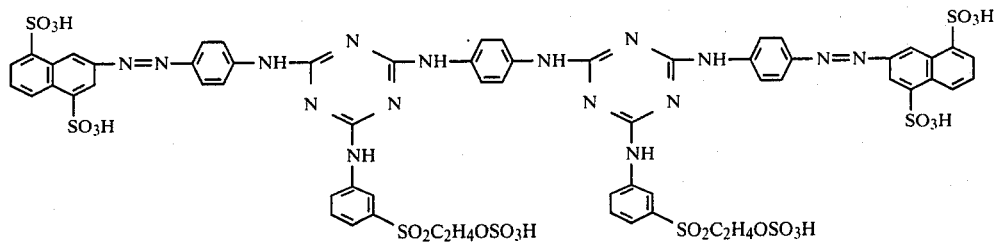

[λ max: 385 nm (water)]

0.2 g of a quinophthalone dyestuff of the structural formula:

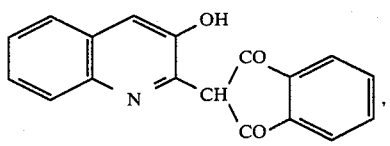

12 g of Glauber salt, and, as a buffer, 0.4 g of Na₂HPO₄.12H₂O and 0.1 g of KH₂PO₄ were added to 200 ml of water. 10 g of a mixed spun cloth of polyester/cotton=50:50 was placed in the bath, then, after raising the temperature for 130° C. over 30 minutes, dyed for 60 minutes, washed with water, soaped, washed with water and dried to obtain a yellow dyed product having good homochromatic properties. This dyeing bath had pH 8 before, during and after dyeing. The degree of fixation of the dyestuff was very good, and the obtained dyed product was of an extremely deep hue and its light fastness, chlorine fastness and sweat-sunlight fastness were all good.

The disazo reactive dyestuff used in this example was produced by procedures similar to those in Example 5 except that the monoazo dye of the structural formula:

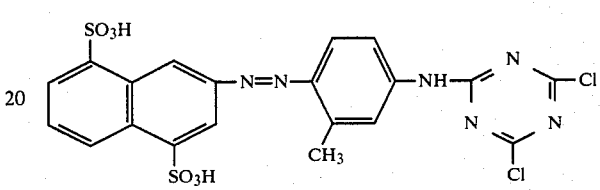

used in Example 5 was replaced by a monoazo dyes of the structural formula:

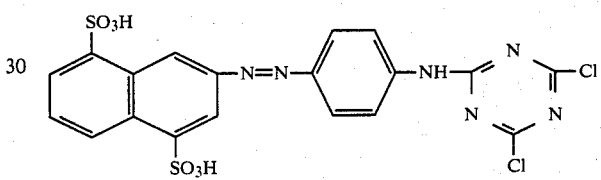

EXAMPLE 8

Cotton cloths were dyed using various disazo reactive dyestuffs of the structural formulae (as the free acid form) set forth in Table 2 in a manner similar to that in Example 5. The results are shown in Table 2.

TABLE 2

General Formula:

(structure shown with two naphthyl-(SO₃H)ₘ groups connected via azo linkages to substituted phenyl rings bearing R⁴, R⁵, NH groups, connected through triazine rings to anilino-SO₂C₂H₄OSO₃H substituents (R², R³), bridged by -Y-)

| No. | (SO₃H)ₘ naphthyl | R²/R³ aryl-SO₂C₂H₄OSO₃H | -R⁵ | -R⁴ | -Y- | Hue of Dyed Product | λmax (water) (nm) |
|---|---|---|---|---|---|---|---|
| 8-1 | naphthalene-1,5-disulfonic acid | p-SO₂C₂H₄OSO₃H phenyl | -H | -H | p-phenylene | Yellow | 385 |
| 8-2 | naphthalene-1,5-disulfonic acid | m-SO₂C₂H₄OSO₃H phenyl | -H | -H | p-phenylene | Yellow | 385 |
| 8-3 | naphthalene-1,5-disulfonic acid | m-SO₂C₂H₄OSO₃H phenyl | -H | -CH₃ | -CH₂CH₂- | Yellow | 390 |

TABLE 2-continued

General Formula:

| No. | (SO₃H)ₘ [naphthyl] | —R⁴ | —R⁵ | —Y— | Hue of Dyed Product | λmax (water) (nm) |
|---|---|---|---|---|---|---|
| 8-4 | naphthalene with SO₃H at 5 and SO₃H at 1 | —NHCOCH₃ | —H | phenyl with OCH₃, OCH₃, SO₂C₂H₄OSO₃H | tolyl (CH₃-phenyl) | Yellow | 396 |
| 8-5 | naphthalene with SO₃H at 5 and SO₃H at 1 | —CH₃ | —OCH₃ | phenyl with SO₂C₂H₄OSO₃H | o-xylyl | Yellow | 397 |

TABLE 2-continued
General Formula:
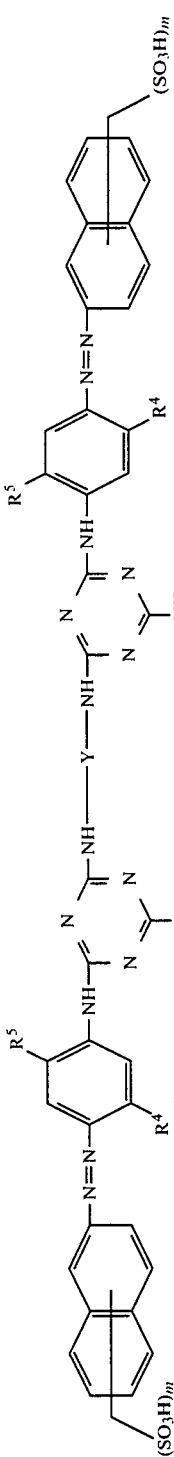
| No. | 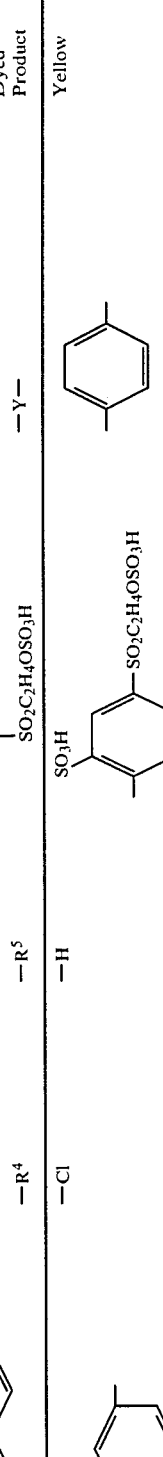 | —R⁴ | —R⁵ | 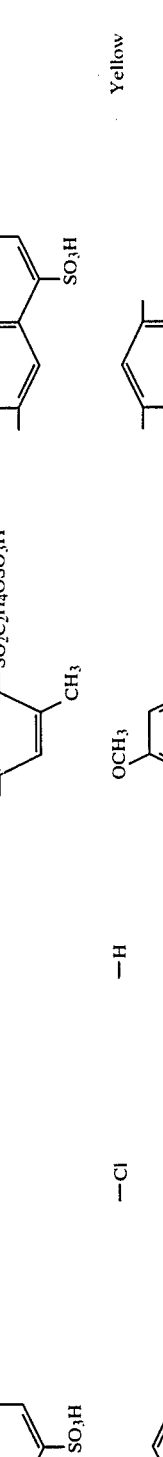 | —Y— | Hue of Dyed Product | λmax (water) (nm) |
|---|---|---|---|---|---|---|---|
| 8-6 | 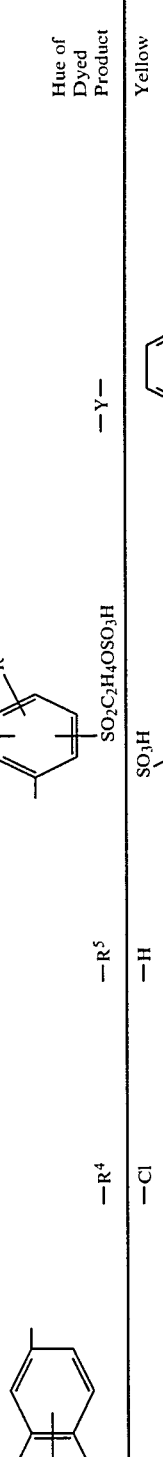 | —Cl | —H | 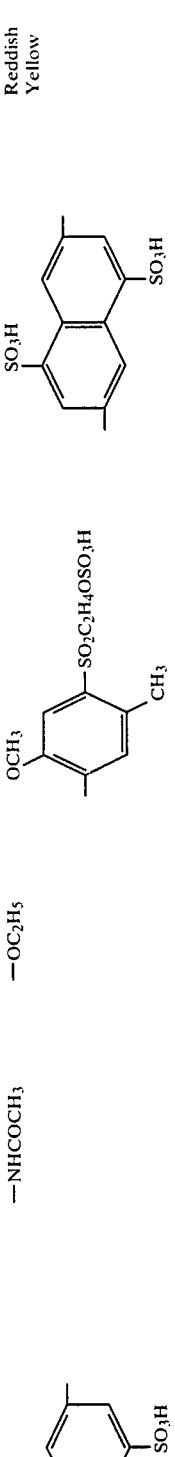 |  | Yellow | 350 |
| 8-7 | 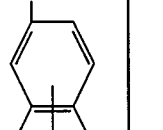 | —NHCOCH₃ | —OC₂H₅ | 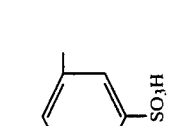 |  | Reddish Yellow | 408 |
| 8-8 | | —Cl | —H | | | Yellow | 350 |

TABLE 2-continued

General Formula:

(Structure: bis-azo dye with two naphthalene-(SO₃H)ₘ groups connected via N=N to phenyl rings bearing R⁴, R⁵, linked to triazine-NH-phenyl(R², R³, SO₂C₂H₄OSO₃H) units joined by —Y— bridge)

| No. | (naphthalene–SO₃H)ₘ | –R⁴ | –R⁵ | (phenyl R², R³, SO₂C₂H₄OSO₃H) | –Y– |
|---|---|---|---|---|---|
| 8-9 | 1,6-naphthalene-disulfonic (SO₃H at 1,6 positions) | –CH₃ | –H | phenyl with –CH₃ and –SO₂C₂H₄OSO₃H (para) | cyclohexane-1,4-diyl (–CH(CH₂CH₂)₂CH–) |
| 8-10 | 1,6-naphthalene-disulfonic | –H | –H | phenyl with –SO₂C₂H₄OSO₃H (meta) | phenyl with –COOH |
| 8-11 | 2,6-naphthalene-disulfonic | –CH₃ | –OCH₃ | phenyl with –CH₃ and –SO₂C₂H₄OSO₃H | –CH₂CH₂CH₂CH₂– |

| No. | Hue of Dyed Product | λmax (water) (nm) |
|---|---|---|
| 8-9 | Yellow | 392 |
| 8-10 | Yellow | 386 |
| 8-11 | Yellow | 398 |

TABLE 2-continued

General Formula:

| No. | ![naphthalene with (SO₃H)ₘ] | —R⁴ | —R⁵ | —Y— | ![phenyl with R² and SO₂C₂H₄OSO₃H] | Hue of Dyed Product | λmax (water) (nm) |
|---|---|---|---|---|---|---|---|
| 8-12 | 2,6-naphthalene-SO₃H (with SO₃H) | —CH₃ | —H | —CH₂CH₂CH₂— | phenyl-SO₂C₂H₄OSO₃H (CH₃) | Yellow | 393 |
| 8-13 | 1,5-naphthalene-di-SO₃H | —NHCONH₂ | —H | phenyl-SO₃H (CH₃) | phenyl-SO₂C₂H₄OSO₃H (CH₃) | Yellow | 398 |
| 8-14 | 1,6-naphthalene-di-SO₃H | —CH₃ | —OCH₃ | phenyl-Cl (CH₃) | phenyl-SO₂C₂H₄OSO₃H (CH₃) | Yellow | 396 |

TABLE 2-continued

General Formula:

[Structure shown with naphthyl-N=N-phenyl(R⁴,R⁵)-NH-C(=N)-N=C(NH-phenyl(R²,R³)-SO₂C₂H₄OSO₃H)-NH-Y-NH-C(=N)-N=C(NH-phenyl(R²,R³)-SO₂C₂H₄OSO₃H)-NH-phenyl(R⁴,R⁵)-N=N-naphthyl, with (SO₃H)ₘ on naphthyl groups]

| No. | —R⁴ | —R⁵ | —Y— | Hue of Dyed Product | λmax (water) (nm) |
|---|---|---|---|---|---|
| 8-15 | —NHCOCH₃ | —OC₂H₅ | [phenylene] | Yellow | 380 |

With additional structural groups shown:
- SO₂C₂H₄OSO₃H on R² phenyl
- Naphthyl with (SO₃H)ₘ
- Naphthalene with SO₃H groups (2,5-disulfo and 3,7-disulfo patterns)

EXAMPLE 9

0.2 g of a disazo reactive dyestuff of the structural formula (as the free acid form):

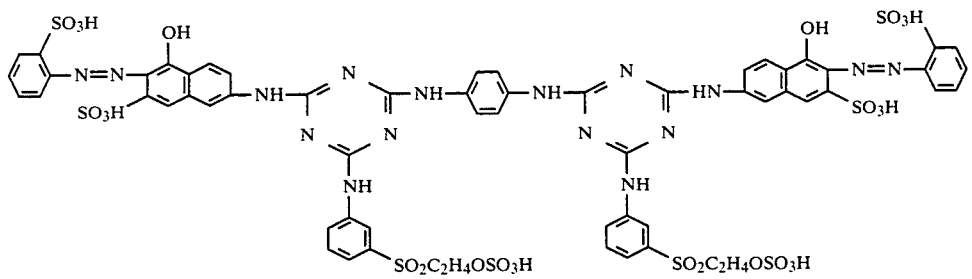

16 g of Glauber salt, and, as a buffer, 0.4 g of Na₂HPO₄.12H₂O and 0.1 g of KH₂PO₄ were added to 200 ml of water to prepare a dyeing bath adjusted to pH=7. 10 g of non-mercerized knitted cotton was placed in the bath, then, after raising the temperature to 120° C. over 30 minutes, dyed at the same temperature for 60 minutes, washed with water, soaped, washed with water and dried to obtain an orange dyed product. The degree of fixation of this dyestuff was very good, and the obtained dyed product was of an extremely deep hue and its light fastness, chlorine fastness and sweat-sunlight fastness were all good.

The disazo reactive dyestuff used in this example was produced by condensing two mole portion of a monoazo dye of the structural formula:

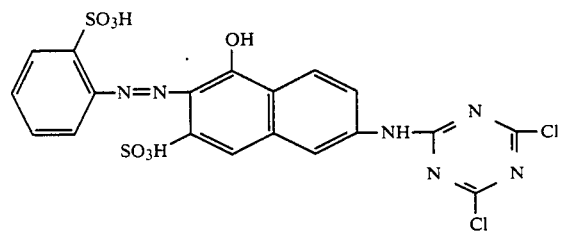

and one mole portion of p-phenylenediamine in a water medium at 30°-40° C. to produce a disazo compound of the structural formula:

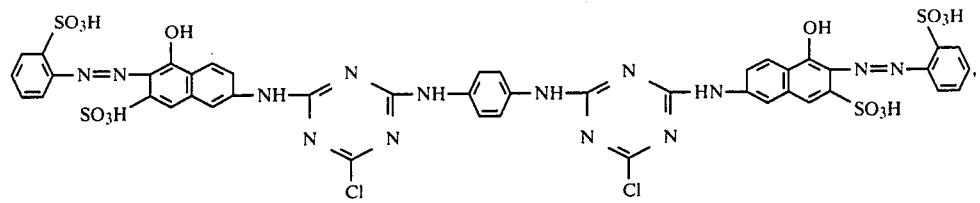

then, adding two mole portion of 3-(β-hydroxyethyl)-sulfonylaniline sulfate ester to said reaction mixture to effect condensation at 90° C., and thereafter salting out the above disazo reactive dyestuff using potassium chloride.

EXAMPLE 10

0.2 g of a disazo reactive dyestuff of the structural formula:

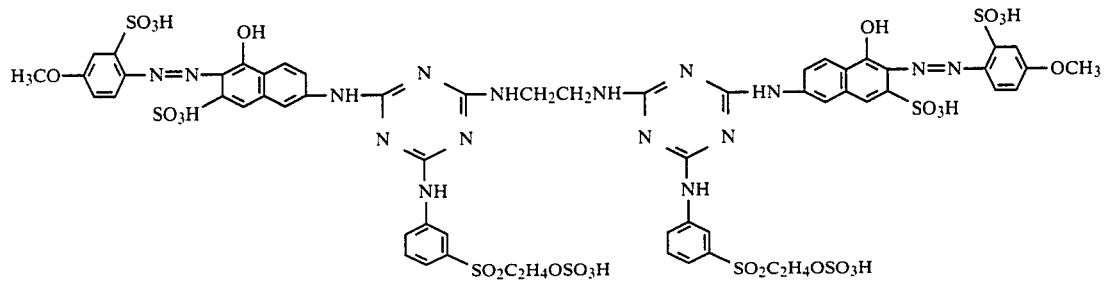

[λ max: 497 nm (water)]

16 g of Glauber salt, and, as a buffer, 0.5 g of Na₂HPO₄.12H₂O and 0.02 g of KH₂PO₄ were added to 200 ml of water to prepare a dyeing bath. 10 g of non-mercerized knitted cotton was placed in the bath, then, after raising the temperature to 130° C. over 30 minutes, dyed at the same temperature for 30 minutes, washed with water, soaped, washed with water and dried to obtain a scarlet dyed product. This dyeing bath had pH 8 before, during and after dyeing. The obtained dyed product was of an extremely deep hue and its light fastness, chlorine fastness and sweat-sunlight fastness were all good.

The disazo reactive dyestuff used in this example was produced by condensing two mole portion of a monoazo dye of the structural formula:

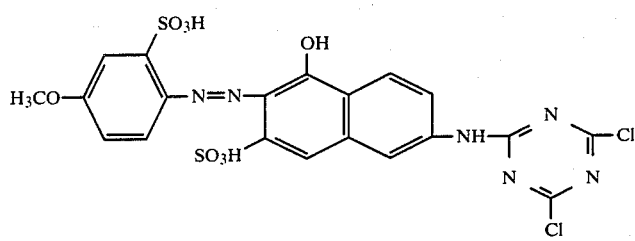

and more mole portion of ethylenediamine in a water medium at 30°-40° C. to produce a disazo compound of the structural formula:

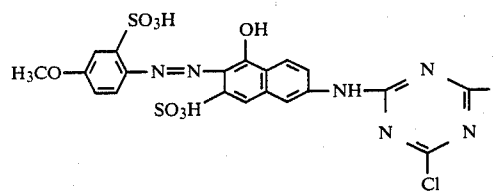

then, adding two mole portion of 3-(β-hydroxyethyl)-sulfonylaniline sulfate ester to said reaction mixture to effect condensation at 90° C., and thereafter spray drying to obtain the above disazo reactive dyestuff.

EXAMPLE 11

0.2 g of a disazo reactive dyestuff of the structural formula:

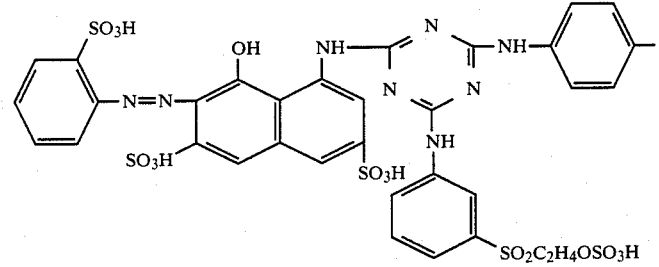

[λ max: 537 nm (water)]

0.2 g of an anthraquinone dyestuff of the structural formula:

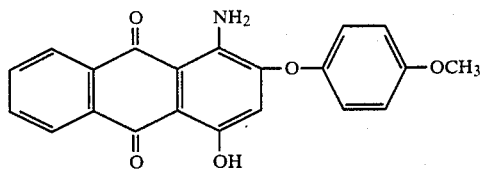

12 g of Glauber salt, and, as a buffer, 0.4 g of Na$_2$HPO$_4$.12H$_2$O and 0.1 g of KH$_2$PO$_4$ were added to 200 ml of water to prepare a dyeing bath. 10 g of a mixed spun cloth of polyester/cotton=50:50 was placed in the bath, then, after raising the temperature to 130° C. over 30 minutes, dyed at the same temperature for 60 minutes, washed with water, soaped, washed with water and dried to obtain a red dyed product having good homochromatic properties. This dyeing bath had pH 8 before, during and after dyeing. Further, the degree of fixation of the dyestuff was very good, and the obtained dyed product was of an extremely deep hue and its light fastness, chlorine fastness and sweat-sunlight fastness were all good.

The disazo reactive dyestuff used in this exampple was produced by procedures similar to those in Example 9 except that the monoazo dye of the structural formula:

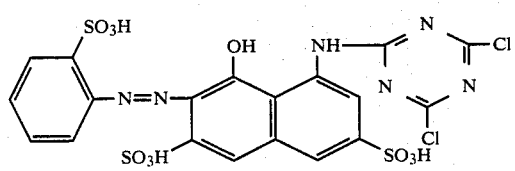

used in Example 9 was replaced by a monoazo dye of the structural formula:

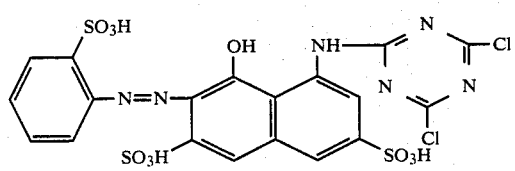

EXAMPLE 12

Cotton cloths were dyed using various disazo reactive dyestuffs of the structural formulae (as the free acid form) set forth in Table 3 in a manner similar to that in Example 9. The results are shown in Table 3.

TABLE 3

General Formula:

[Structure showing bis-azo dye with two naphthol groups connected through triazine-NH-Y-NH-triazine bridge, with D¹-N=N groups and aniline substituents bearing R², R³, and SO₂C₂H₄OSO₃H]

| No. | D¹— | (naphthol with SO₃H) | —R¹ | R², R³ substituted phenyl-SO₂C₂H₄OSO₃H | —Y— | Hue of Dyed Product | λmax (water) (nm) |
|---|---|---|---|---|---|---|---|
| 12-1 | 2-sulfophenyl | 1-OH, 3-SO₃H naphthyl | —CH₃ | 4-SO₂C₂H₄OSO₃H phenyl | para-phenylene | Orange | 477 |
| 12-2 | 2-methyl-4-sulfophenyl | 1-OH, 3-SO₃H naphthyl | —H | 3-SO₂C₂H₄OSO₃H phenyl | para-phenylene | Orange | 475 |
| 12-3 | 2-methyl-5-methyl (H₃C)-sulfophenyl | 1-OH, 3-SO₃H naphthyl | —H | 3-SO₂C₂H₄OSO₃H phenyl | —CH₂CH₂— | Orange | 487 |

TABLE 3-continued

General Formula:

[Structure: bis-azo naphthalenol dye with triazine linker containing D¹-N=N-naphthalenol-(SO₃H)ₙ-N(R¹)-triazine-NH-aryl(R²,R³)(SO₂C₂H₄OSO₃H) bridged via NH-Y-NH to symmetric half]

| No. | D¹— | —R¹ | —Y— | Hue of Dyed Product | λmax (water) (nm) |
|---|---|---|---|---|---|
| 12-4 | 2-SO₃H, 5-OCH₃ phenyl | —H | tolyl (CH₃) | Scarlet | 497 |
| 12-5 | 2-SO₃H phenyl (with naphthalenol-OH, SO₃H coupler having OCH₃, SO₂C₂H₄OSO₃H substituents) | —H | xylyl | Reddish Orange | 490 |
| 12-6 | 2-SO₃H phenyl (with naphthalenol-OH, SO₃H coupler having SO₂C₂H₄OSO₃H substituent) | —CH₃ | phenyl-SO₃H | Reddish Orange | 491 |

TABLE 3-continued

General Formula:

[Structure with general formula containing D¹-N=N-, OH, SO₃H, (SO₃H)ₙ groups, R¹, NH-Y-NH linkage, triazine rings, and R², R³ substituted phenyl-SO₂C₂H₄OSO₃H groups]

| No. | D¹— | —R¹ | [coupler structure] | —Y— | Hue of Dyed Product | λmax (water) (nm) |
|-----|-----|-----|---------------------|-----|---------------------|-------------------|
| 12-7 | 2-methoxy-5-methyl benzenesulfonic acid group | —C₂H₅ | [phenyl with SO₂C₂H₄OSO₃H]; [naphthol with OH, SO₃H] | [p-phenylene] | Scarlet | 498 |
| 12-8 | 2-methoxy-5-methyl benzenesulfonic acid group | —H | [phenyl with SO₂C₂H₄OSO₃H]; [naphthol with OH, SO₃H] | —CH₂CH₂CH₂— | Scarlet | 496 |
| 12-9 | 2-methyl benzenesulfonic acid group | —H | [phenyl with SO₂C₂H₄OSO₃H]; [naphthol with OH, SO₃H] | [naphthalene-1,5-disulfonic acid group] | Orange | 475 |

TABLE 3-continued
General Formula:
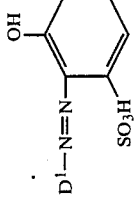
| No. | D¹— | —R¹ | —Y— | Hue of Dyed Product | λmax (water) (nm) |
|---|---|---|---|---|---|
| 12-10 | 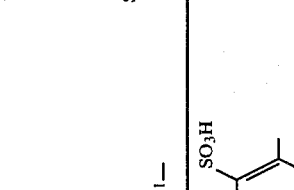 | 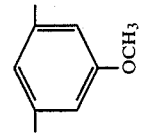 | —H | 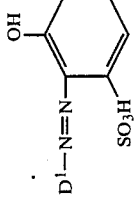 | Reddish Orange | 491 |
| 12-11 | 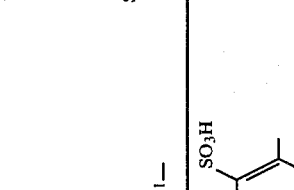 | 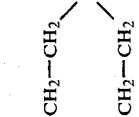 | —H | 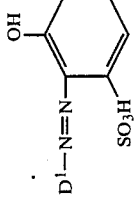 | Reddish Orange | 493 |
| 12-12 | 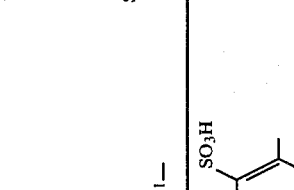 | 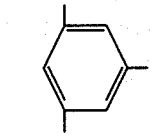 | —H | (COOH phenyl) | Orange | 484 |

TABLE 3-continued
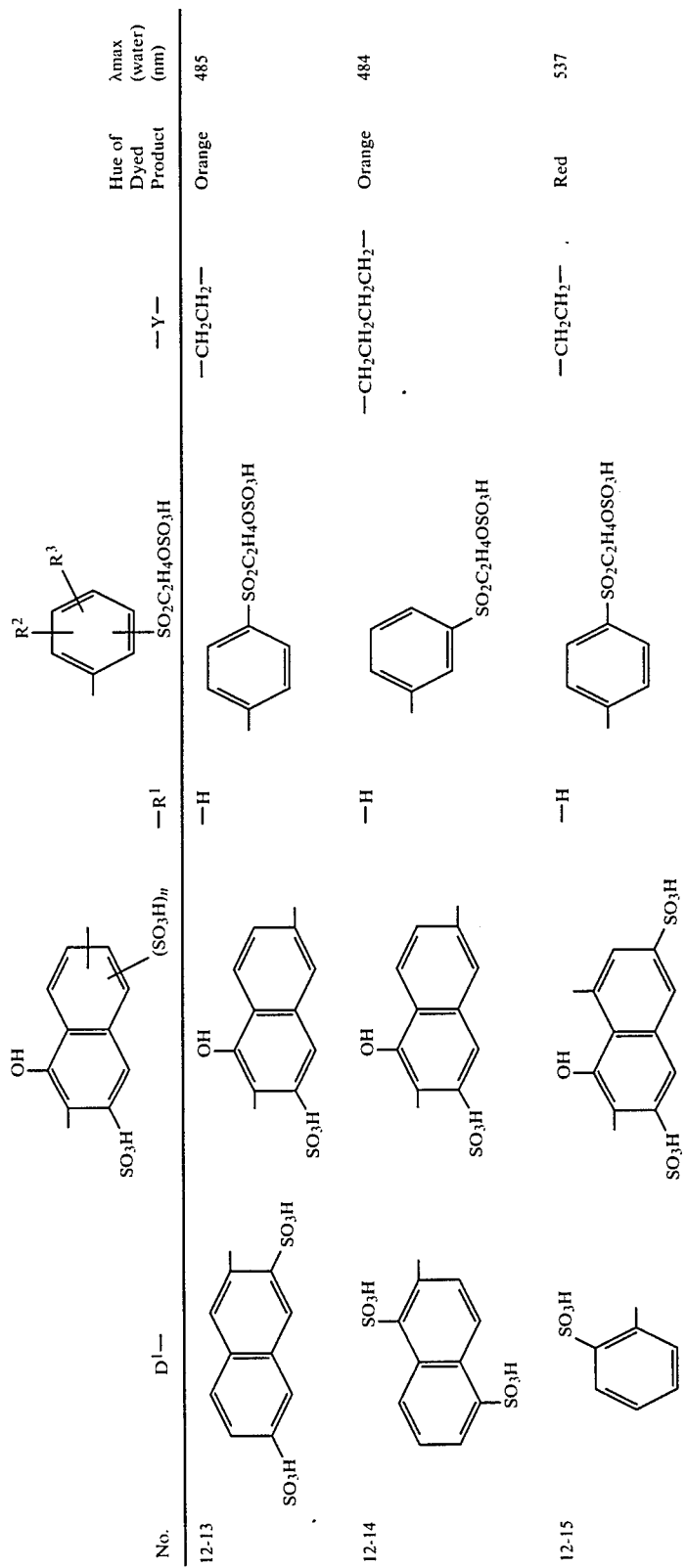

TABLE 3-continued

General Formula:

$$D^1-N=N-\text{[naphthalene with OH, SO}_3\text{H, (SO}_3\text{H)}_n\text{]}-N(R^1)-\text{[triazine]}-NH-\text{[phenyl with }R^2, R^3, SO_2C_2H_4OSO_3H\text{]}$$

[Symmetric bis-azo structure with two naphthol-triazine-aniline halves linked by $-NH-Y-NH-$ bridge between the two triazine rings]

| No. | $D^1-$ | [naphthol middle] | $-R^1$ | [aniline coupler] | $-Y-$ | Hue of Dyed Product | λmax (water) (nm) |
|---|---|---|---|---|---|---|---|
| 12-16 | 2-methyl-4-sulfo-phenyl (SO₃H, CH₃) | 1-hydroxy-naphthalene-3-SO₃H, with SO₃H | —H | 4-(SO₂C₂H₄OSO₃H)-2-methoxy-phenyl (OCH₃) | 1,4-phenylene | Red | 536 |
| 12-17 | 2-methyl-5-methyl... (H₃C, SO₃H) | 1-hydroxy-naphthalene with SO₃H groups | —H | 4-(SO₂C₂H₄OSO₃H)-phenyl | 2-methyl-1,4-phenylene (CH₃) | Bluish Red | 550 |
| 12-18 | 2-methyl-5-methoxy-phenyl (H₃CO, SO₃H) | 1-hydroxy-naphthalene with SO₃H groups | —H | 4-(SO₂C₂H₄OSO₃H)-2-methoxy-phenyl (OCH₃) | —CH₂CH₂CH₂CH₂— | Reddish Purple | 532 |

TABLE 3-continued

General Formula:

[Structure shown with general formula containing D¹-N=N-, OH, SO₃H groups, naphthalene rings connected via NH-Y-NH triazine linkages with R¹, R², R³ substituents]

| No. | D¹- | -R¹ | -Y- | Hue of Dyed Product | λmax (water) (nm) |
|---|---|---|---|---|---|
| 12-19 | [phenyl with SO₃H (ortho)] + [naphthalene with OH, SO₃H] | -H | [phenyl with Cl] + [phenyl with SO₂C₂H₄OSO₃H, OCH₃, CH₃] | Red | 513 |
| 12-20 | [phenyl with SO₃H] + [naphthalene with OH, SO₃H, SO₃H] | -C₄H₉(n) | [phenyl] + [phenyl with SO₂C₂H₄OSO₃H] | Red | 538 |
| 12-21 | [naphthalene with SO₃H] + [naphthalene with OH, SO₃H, SO₃H] | -H | [phenyl with SO₃H] + [phenyl with SO₂C₂H₄OSO₃H] | Bluish Red | 543 |

TABLE 3-continued

General Formula:

[Structure: D¹—N=N—(naphthalene with OH, SO₃H, (SO₃H)ₙ)—N(R¹)—(triazine with NH-aryl(R²,R³)(SO₂C₂H₄OSO₃H))—NH—Y—NH—(triazine with NH-aryl(R²,R³)(SO₂C₂H₄OSO₃H))—N(R¹)—(naphthalene with OH, (SO₃H)ₙ)—N=N—D¹]

| No. | D¹— | (naphthol component) | —R¹ | aryl(R²,R³) | —Y— | Hue of Dyed Product | λmax (water) (nm) |
|---|---|---|---|---|---|---|---|
| 12-22 | naphthalene with SO₃H, SO₃H | naphthol with OH, SO₃H, CH₃ | —H | phenyl with OCH₃, CH₃, SO₂C₂H₄OSO₃H | —CH₂CH₂— | Bluish Red | 542 |
| 12-23 | naphthalene with SO₃H, SO₃H | naphthol with OH, SO₃H, SO₃H | —H | phenyl with SO₃H, CH₃, SO₂C₂H₄OSO₃H | —C₆H₄— (p-phenylene) | Bluish Red | 540 |

EXAMPLE 13

0.2 g of a disazo reactive dyestuff of the structural formula (as the free acid form):

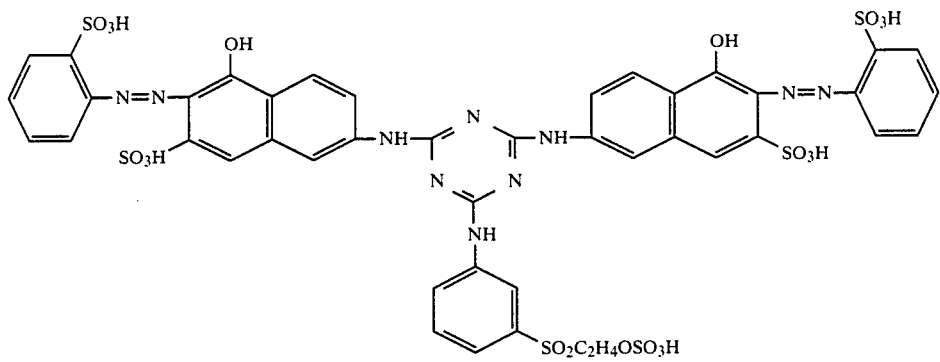

[λ max: 475 nm (water)], 16 g of Glauber salt, and, as a buffer, 0.4 g of Na₂H-PO₄.12H₂O and 0.1 g of KH₂PO₄ were added to 200 ml of water to prepare a dyeing bath adjusted to pH=7. 10 g of non-mercerized knitted cotton was placed in the bath, then, after raising the temperature to 120° C., dyed at the same temperature for 60 minutes, washed with water, soaped, washed with water and dried to obtain an orange dyed product. The degree of fixation of this dyestuff was very good, and the obtained dye product was of an extremely deep hue and its light fastness, chlorine fastness and sweat-light fastness were all good.

The disazo reactive dyestuff used in this example was produced by condensing one mole portion of a monoazo dye of the structural formula:

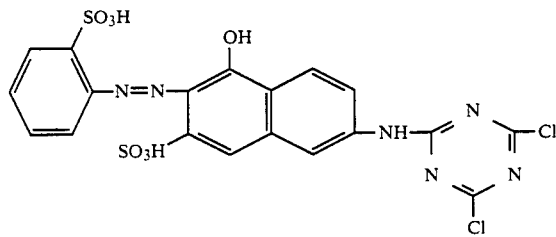

and one mole portion of a monoazo dye of the structural formula:

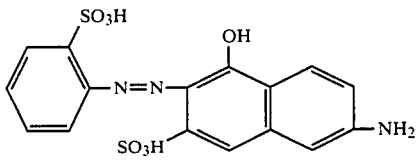

in a water medium at 30°–40° C. to produce a disazo compound of the structural formula:

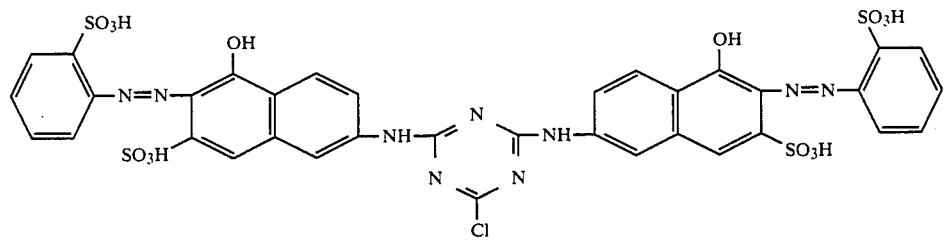

then, adding one mole portion of 3-(β-hydroxyethyl)-sulfonylaniline sulfate ester to said reaction mixture to effect condensation at 90° C., and thereafter salting out the above disazo reactive dyestuff using potassium chloride.

EXAMPLE 14

0.2 g of a disazo reactive dyestuff of the structural formula (as the free acid form):

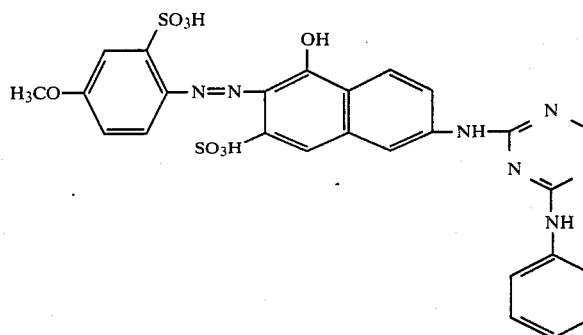

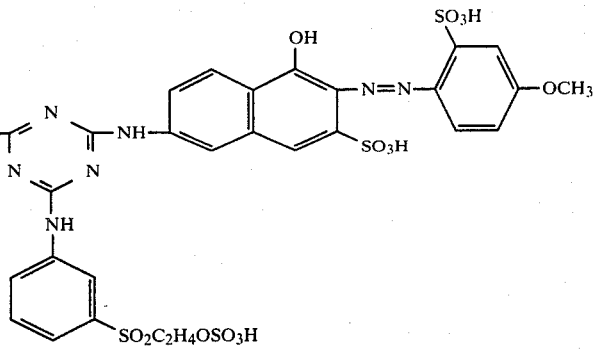

[λ max: 495 nm (water)], 16 g of Glauber salt, and, as a buffer, 0.5 g of Na$_2$HPO$_4$.12H$_2$O and 0.02 g of KH$_2$PO$_4$ were added to 200 ml of water to prepare a dyeing bath. 10 g of non-mercerized knitted cotton was placed in the bath, then, after raising the temperature to 130° C. over 30 minutes, dyed at the same temperature for 30 minutes, washed with water, soaped, washed with water and dried to obtain a scarlet dyed product. This dyeing bath had pH 8 before, during and after dyeing. The obtained dyed product was of an extremely deep hue and its light fastness, chlorine fastness and sweat-sunlight fastness were all good.

The disazo reactive dyestuff used in this example was produced by condensing one mole portion of a monoazo dye of the structural formula:

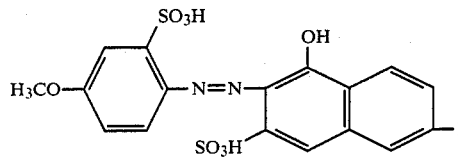

and one mole portion of a monoazo dye of the structural formula:

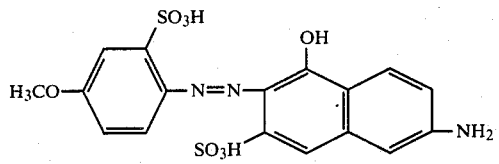

in a water medium at 30°–40° C. to produce a disazo compound of the structural formula:

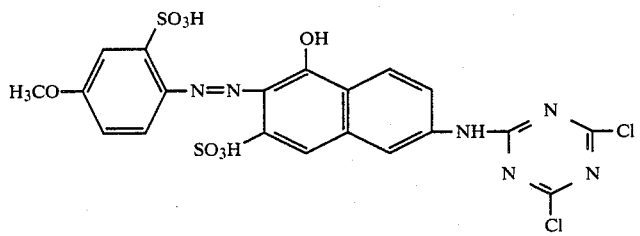

then, adding one mole portion of 3-(β-hydroxyethyl)-sulfonylaniline sulfate ester to said reaction mixture to effect condensation at 90° C., and thereafter spray drying to obtain the above disazo reactive dyestuff.

EXAMPLE 15

0.2 g of a disazo reactive dyestuff of the structural formula (as the free acid form):

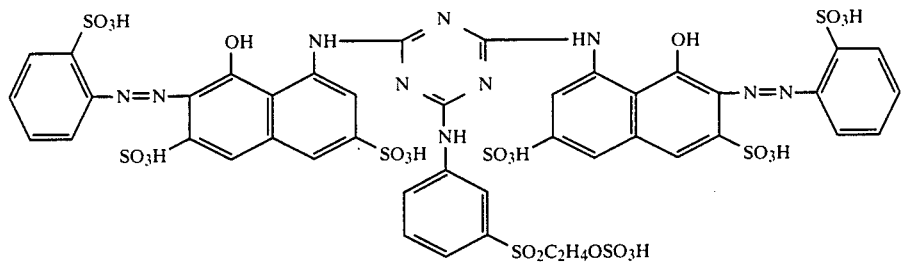

[λ max: 535 nm (water)], 0.2 g of an anthraquinone dyestuff of the structural formula:

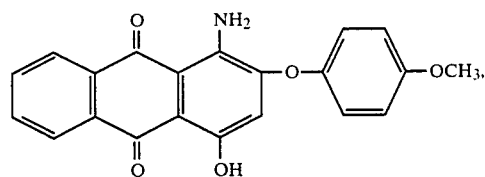

12 g of Glauber salt, and, as a buffer, 0.4 g of Na$_2$H-PO$_4$.12H$_2$O and 0.1 g of KH$_2$PO$_4$ were added to 200 ml of water to prepare a dyeing bath. 10 g of a mixed spun cloth of polyester/cotton=50:50 was placed in the bath, then, after raising the temperature to 130° C. over 30 minutes, dyed at the same temperature for 60 minutes, washed with water, soaped, washed with water and dried to obtain a red dyed product having good homochromatic properties. This dyeing bath had pH 8 before, during and after dyeing. Further, the degree of fixation of the dyestuff was very good, and the obtained dyed product was of an extremely deep hue and its light fastness, chlorine fastness and sweat-sunlight fastness were all good.

The disazo reactive dyestuff used in this example was produced by procedure similar to those in Example 13 except that the monoazo dye of the structural formula:

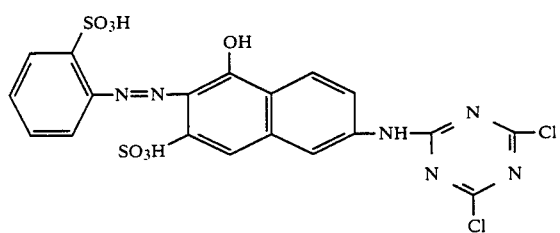

used in Example 13 was replaced by a monoazo dye of the structural formula:

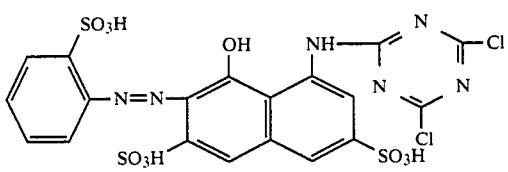

and the monoazo dye of the structural formula:

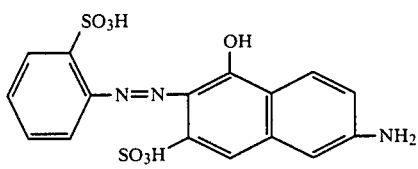

used in Example 13 was replaced by a monoazo dye of the structural formula:

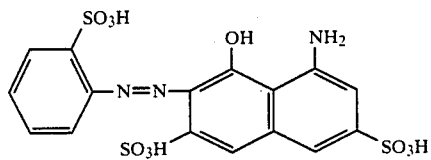

EXAMPLE 16

Cotton cloths were dyed using various disazo reactive dyestuffs of the structural formulae (as the free acid form) set forth in Table 4 in a manner similar to that in Example 13. The results are shown in Table 4.

TABLE 4

General Formula:

D¹—N=N— [naphthol-SO₃H-(SO₃H)ₙ] —N(R¹)—C(=N—)—N=C—N(R¹)— [naphthol-(SO₃H)ₙ-SO₃H] —N=N—D¹, with central triazine bearing —NH—C₆H₃(R²)(R³)—SO₂C₂H₄OSO₃H

| No. | D¹— | [naphthol with OH, SO₃H, (SO₃H)ₙ] | —R¹ | [phenyl with R², R³, SO₂C₂H₄OSO₃H] | Hue of Dyed Product | λmax (water) (nm) |
|---|---|---|---|---|---|---|
| 16-1 | 2-SO₃H-phenyl | 1-OH, 3-SO₃H-naphthyl | —CH₃ | 4-SO₂C₂H₄OSO₃H-phenyl | Orange | 477 |
| 16-2 | 2,5-disulfophenyl (SO₃H at 2 and 5) | 1-OH, 3-SO₃H-naphthyl | —H | 3-SO₂C₂H₄OSO₃H-phenyl | Orange | 475 |
| 16-3 | 2-SO₃H-5-CH₃-phenyl | 1-OH, 3-SO₃H-naphthyl | —H | 3-SO₂C₂H₄OSO₃H-phenyl | Orange | 487 |
| 16-4 | 2-SO₃H-5-OCH₃-phenyl | 1-OH, 3-SO₃H-naphthyl | —H | 2-OCH₃-4-SO₂C₂H₄OSO₃H-phenyl | Scarlet | 497 |
| 16-5 | 2-SO₃H-phenyl | 1-OH, 3-SO₃H-naphthyl | —H | 2-OCH₃-5-CH₃-4-SO₂C₂H₄OSO₃H-phenyl | Reddish Orange | 490 |
| 16-6 | 2-SO₃H-phenyl | 1-OH, 3-SO₃H-naphthyl | —CH₃ | 4-SO₂C₂H₄OSO₃H-phenyl | Reddish Orange | 491 |
| 16-7 | 2-SO₃H-5-OCH₃-phenyl | 1-OH, 3-SO₃H-naphthyl | —C₂H₅ | 3-SO₂C₂H₄OSO₃H-phenyl | Scarlet | 498 |
| 16-8 | 2-SO₃H-5-OCH₃-phenyl | 1-OH, 3-SO₃H, 5-SO₃H-naphthyl | —H | 3-SO₂C₂H₄OSO₃H-phenyl | Scarlet | 496 |
| 16-9 | 2-SO₃H-phenyl | 1-OH, 3-SO₃H, 5-SO₃H-naphthyl | —H | 3-SO₂C₂H₄OSO₃H-phenyl | Orange | 475 |

TABLE 4-continued

General Formula:

[Structure showing bis-azo dye with triazine linker, two naphthol-azo-D¹ groups with SO₃H and (SO₃H)ₙ substituents, connected through R¹-N groups to a central triazine bearing NH-phenyl group with R², R³ and SO₂C₂H₄OSO₃H substituents]

| No. | D¹— | [naphthol with OH, SO₃H, (SO₃H)ₙ] | —R¹ | [phenyl with R², R³, SO₂C₂H₄OSO₃H] | Hue of Dyed Product | λmax (water) (nm) |
|---|---|---|---|---|---|---|
| 16-10 | 2-methylphenyl-SO₃H | naphthol-2,7-disulfonic acid derivative | —H | 2-methyl-4-(SO₂C₂H₄OSO₃H)phenyl | Reddish Orange | 491 |
| 16-11 | 2-methyl-1,5-naphthalenedisulfonic acid | naphthol-SO₃H | —H | 2,5-dimethoxy-4-(SO₂C₂H₄OSO₃H)phenyl | Reddish Orange | 493 |
| 16-12 | 2-methyl-1-naphthalenesulfonic acid | naphthol-SO₃H | —H | 4-(SO₂C₂H₄OSO₃H)phenyl | Orange | 484 |
| 16-13 | 2,6-naphthalenedisulfonic acid derivative | naphthol-SO₃H | —H | 4-(SO₂C₂H₄OSO₃H)phenyl | Orange | 485 |
| 16-14 | 2-methyl-1,5-naphthalenedisulfonic acid | naphthol-SO₃H | —H | 3-(SO₂C₂H₄OSO₃H)phenyl | Orange | 484 |
| 16-15 | 2-methylphenyl-SO₃H | 8-methyl-naphthol-3,6-disulfonic acid derivative | —H | 4-(SO₂C₂H₄OSO₃H)phenyl | Red | 537 |
| 16-16 | 2,5-disulfonic acid phenyl | 8-methyl-naphthol-3,6-disulfonic acid derivative | —H | 2-methoxy-5-(SO₂C₂H₄OSO₃H)phenyl | Red | 536 |
| 16-17 | 5-methyl-2-sulfonic acid phenyl (H₃C-) | 8-methyl-naphthol-3,6-disulfonic acid derivative | —H | 4-(SO₂C₂H₄OSO₃H)phenyl | Bluish Red | 550 |
| 16-18 | 5-methoxy-2-sulfonic acid phenyl (H₃CO-) | 8-methyl-naphthol-3,6-disulfonic acid derivative | —H | 2-methoxy-5-(SO₂C₂H₄OSO₃H)phenyl | Reddish Purple | 532 |

TABLE 4-continued

General Formula:

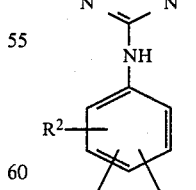

| No. | D¹— | (structure with OH, SO₃H, (SO₃H)ₙ) | —R¹ | SO₂C₂H₄OSO₃H (with R², R³) | Hue of Dyed Product | λmax (water) (nm) |
|---|---|---|---|---|---|---|
| 16-19 | 2-SO₃H phenyl | OH naphthalene with SO₃H, SO₃H | —H | 2-OCH₃, 5-CH₃ phenyl-SO₂C₂H₄OSO₃H | Red | 513 |
| 16-20 | 2-SO₃H phenyl | OH naphthalene with SO₃H, SO₃H | —C₄H₉(n) | phenyl-SO₂C₂H₄OSO₃H | Red | 538 |
| 16-21 | 2-SO₃H naphthyl | OH naphthalene with SO₃H, SO₃H | —H | phenyl-SO₂C₂H₄OSO₃H | Bluish Red | 543 |
| 16-22 | 2-SO₃H-5-SO₃H naphthyl | OH naphthalene with SO₃H, SO₃H | —H | 2-OCH₃, 5-CH₃ phenyl-SO₂C₂H₄OSO₃H | Bluish Red | 542 |
| 16-23 | 2-SO₃H-5-SO₃H naphthyl | OH naphthalene with SO₃H, SO₃H | —H | SO₃H, SO₂C₂H₄OSO₃H phenyl | Red | 540 |

What is claimed is:

1. A disazo reactive dyestuff for cellulose fibers which is of the formula:

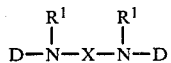

wherein D is a radical of a monoazo dye, R¹ is hydrogen or lower alkyl, and X is a group:

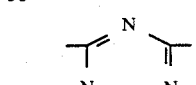 or

-continued

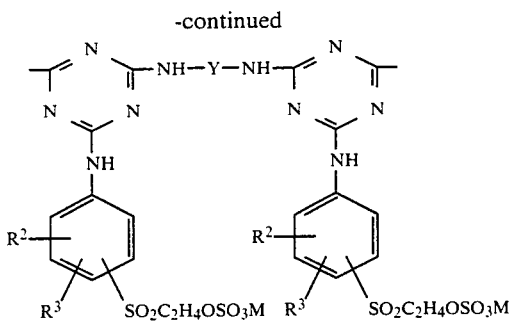

wherein $R^2$ and $R^3$ are each hydrogen, methyl, methoxy or $-SO_3M$, Y is a divalent radical selected from the group consisting of phenylene or phenylene substituted with methyl, methoxy, sulfonic acid, carboxylic acid radical, or chlorine, a linear alkylene group having 2 to 6 carbon atoms;

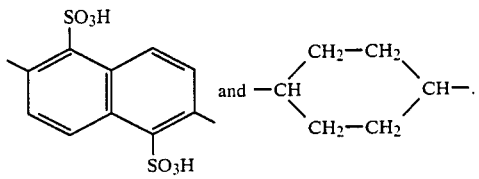

2. The disazo reactive dyestuff for cellulose fibers according to claim 1 wherein

is of the formula:

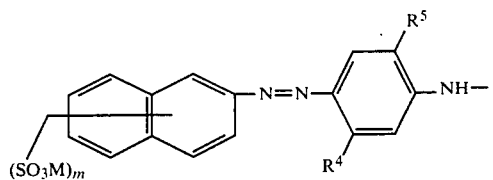

wherein M is hydrogen or an alkali metal, $R^4$ is hydrogen, lower alkyl, lower alkoxy, acetylamino, carbamoylamino or chlorine, $R^5$ is hydrogen, lower alkyl or lower alkoxy, and m is 2 or 3.

3. The disazo reactive dyestuff for cellulose fibers according to claim 1 wherein

is of the formula:

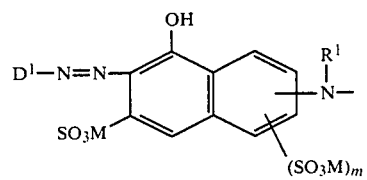

wherein M is hydrogen or an alkali metal, $D^1$ is a radical of a benzene or naphthalene diazo component, $R^1$ is hydrogen or lower alkyl, and n is 0 or 1.

4. The disazo reactive dyestuff for cellulose fibers according to claim 1 which is of the formula:

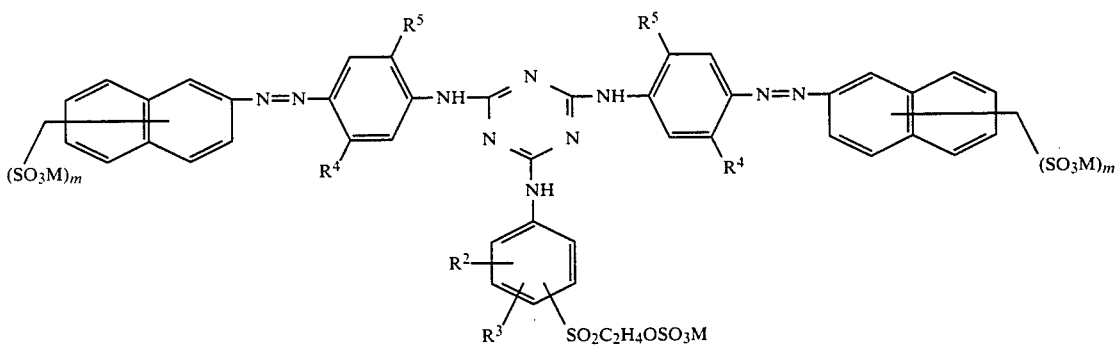

wherein $R^2$ and $R^3$ are each hydrogen, methyl, methoxy or $-SO_3M$, $R^4$ is hydrogen, lower alkyl, lower alkoxy, acetylamino, carbamoylamino or chlorine, $R^5$ is hydrogen, lower alkyl or lower alkoxy, M is hydrogen or an alkali metal, and m is 2 or 3.

5. The disazo reactive dyestuff for cellulose fibers according to claim 4 wherein $R^2$ and $R^3$ are hydrogen, $R^4$ is lower alkyl, and $R^5$ is hydrogen.

6. The disazo reactive dyestuff for cellulose fibers according to claim 1 which is of the formula:

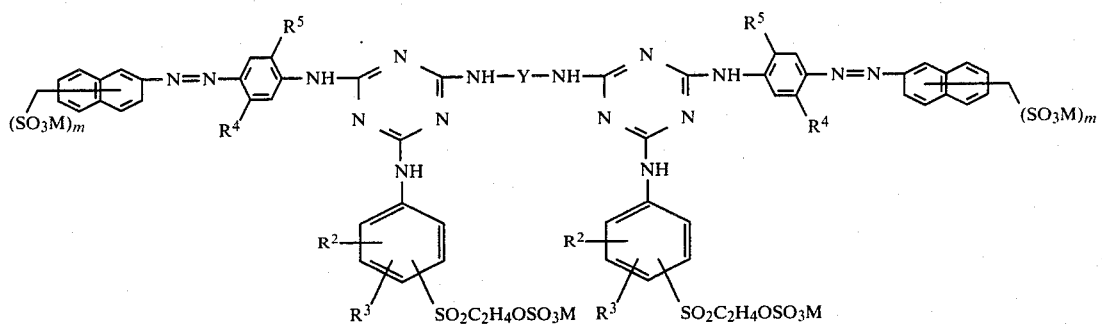

wherein $R^2$ and $R^3$ are each hydrogen, methyl, methoxy or —$SO_3M$, $R^4$ is hydrogen, lower alkyl, lower alkoxy, acetylamino, carbamoylamino or chlorine, $R^5$ is hydrogen, lower alkyl or lower alkoxy, M is hydrogen or an alkali metal, Y is an aromatic or aliphatic divalent radical, and m is 2 or 3.

7. The disazo reactive dyestuff for cellulose fibers according to claim 1 which is of the formula:

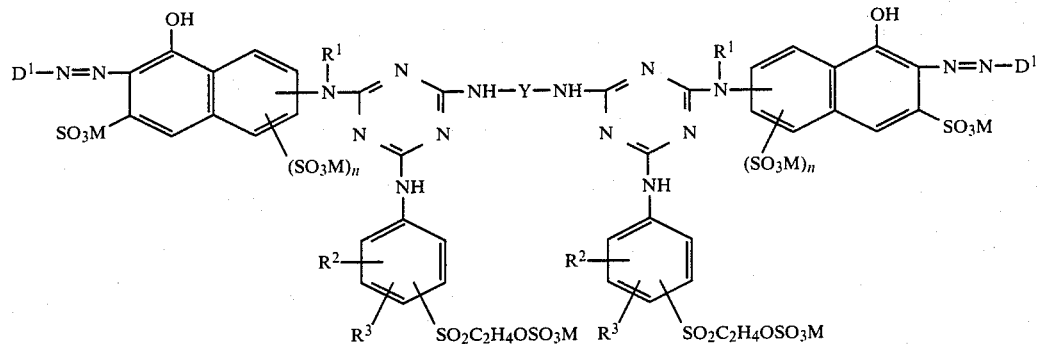

wherein $R^1$ is hydrogen or lower alkyl, $R^2$ and $R^3$ are each hydrogen, methyl, methoxy or —$SO_3M$, $D^1$ is a radical of a benzene or naphthalene diazo component, M is hydrogen or an alkali metal, and n is 0 or 1.

8. The disazo reactive dyestuff for cellulose fibers according to claim 7 wherein $R^1$, $R^2$ and $R^3$ are hydrogen, $D^1$ is a radical of a benzene diazo component, and Y is phenylene.

9. The disazo reactive dyestuff for cellulose fibers according to claim 8 wherein the radical of the benzene diazo component represented by $D^1$ is of the formula:

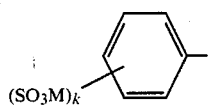

wherein k is 1 or 2 and M is hydrogen or an alkali metal.

10. The disazo reactive dyestuff for cellulose fibers according to claim 1 which is of the formula:

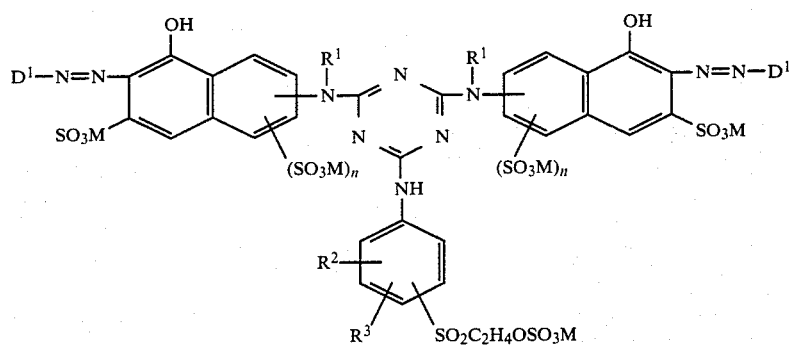

wherein $R^1$ is hydrogen or lower alkyl, $R^2$ and $R^3$ are hydrogen, methyl, methoxy or —$SO_3M$, $D^1$ is a radical of a benzene or naphthalene diazo component, M is hydrogen or an alkali metal, and n is 0 or 1.

* * * * *